(12) United States Patent
Dobek et al.

(10) Patent No.: US 9,121,303 B2
(45) Date of Patent: Sep. 1, 2015

(54) BEARING SYSTEM

(75) Inventors: Louis J. Dobek, Somers, CT (US);
David M. Daley, Manchester, CT (US);
Mark A. Metzger, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 2171 days.

(21) Appl. No.: 12/136,300

(22) Filed: Jun. 10, 2008

(65) Prior Publication Data

US 2009/0317029 A1 Dec. 24, 2009

(51) Int. Cl.
*F16C 19/00* (2006.01)
*F01D 25/16* (2006.01)
*F16C 33/66* (2006.01)
*F01D 25/18* (2006.01)

(52) U.S. Cl.
CPC ............... *F01D 25/16* (2013.01); *F01D 25/18* (2013.01); *F16C 33/6685* (2013.01)

(58) Field of Classification Search
USPC ................ 384/462, 465, 466, 468, 470–475; 184/6.11, 6.16; 415/175, 176
See application file for complete search history.

(56) References Cited

U.S. PATENT DOCUMENTS

| | | | |
|---|---|---|---|
| 3,269,786 A | 8/1966 | Diver | |
| 3,893,737 A | 7/1975 | Tyson | |
| 3,980,359 A | 9/1976 | Wetherbee | |
| 4,283,096 A | 8/1981 | Picard | |
| 4,323,289 A | 4/1982 | Suzuki | |
| 4,334,720 A * | 6/1982 | Signer | 384/475 |
| 4,385,788 A | 5/1983 | Brown | |
| 4,400,040 A | 8/1983 | Toth | |
| 4,428,628 A | 1/1984 | Brown | |
| 4,463,994 A | 8/1984 | Eliason | |
| 4,721,398 A | 1/1988 | Miyashita | |
| 4,787,757 A | 11/1988 | Finger | |
| 5,106,209 A * | 4/1992 | Atkinson et al. | 384/475 |
| 5,183,342 A | 2/1993 | Daiber | |
| 5,201,844 A | 4/1993 | Greenwood | |
| 5,328,277 A | 7/1994 | Moulton | |
| 6,464,401 B1 | 10/2002 | Allard | |
| 6,471,411 B2 | 10/2002 | VonHackewitz | |

(Continued)

FOREIGN PATENT DOCUMENTS

EP 1640627 A1 3/2006
GB 579252 7/1946

(Continued)

OTHER PUBLICATIONS

U.S. Appl. No. 12/033,911, filed Feb. 20, 2008.
European Search Report dated Oct. 16, 2012.

*Primary Examiner* — James Pilkington
(74) *Attorney, Agent, or Firm* — Carlson, Gaskey & Olds, PC (57) ABSTRACT

A bearing system includes an inner ring that surrounds an axis of rotation, an outer ring spaced radially outwards from the inner ring, and a cage that is positioned between the inner and outer rings to support a plurality of bearing elements. The inner ring includes an axial slot that extends in a direction along the axis of rotation. The inner ring also includes at least one radial side slot formed in at least one of a fore and aft end surface of the inner ring. The radial side slot directs lubricating fluid from the axial slot toward the cage to lubricate the plurality of bearing elements.

16 Claims, 4 Drawing Sheets

(56) References Cited

U.S. PATENT DOCUMENTS

| | | |
|---|---|---|
| 6,511,228 B2 | 1/2003 | Dusza |
| 6,682,222 B2 | 1/2004 | Fisher |
| 6,758,598 B2 | 7/2004 | Beauvais |
| 2006/0159378 A1* | 7/2006 | Plona .......................... 384/462 |

FOREIGN PATENT DOCUMENTS

| | | |
|---|---|---|
| GB | 821346 | 11/1955 |
| JP | 63-231021 * | 9/1988 |
| JP | H0522850 | 3/1993 |
| JP | 2005291445 A | 10/2005 |

* cited by examiner

FIG.2

US 9,121,303 B2

BEARING SYSTEM

BACKGROUND OF THE INVENTION

This disclosure relates to a bearing system for a gas turbine engine, and more particularly to a lubrication arrangement for a bearing system configuration that reduces stress levels on bearing components.

Gas turbine engines utilize bearing assemblies at various locations throughout the engine to support components for rotation about an engine axis. A typical bearing assembly includes an inner ring, an outer ring radially spaced from the inner ring, and a cage positioned between the inner and outer rings that holds a plurality of roller or bearing elements.

A lubrication system is used to provide lubricating fluid to the bearing elements. Traditionally, the inner ring includes axial slots that extend in a direction of the engine axis and a plurality of radial holes that extend radially outwardly toward the cage. Lubricating fluid is delivered to the axial slots and is communicated to the bearing elements via the radial holes.

The bearing assembly can be subjected to relatively high centrifugal loads, high assembly loads, and/or high operating loads that result in relatively high stress levels on individual components of the bearing assembly, such as the inner ring for example. The stress levels on a component such as the inner ring may be amplified by the particular arrangement of the slots and holes. For example, at an intersection between the axial slots and the radial holes may amplify stresses in the inner ring.

Thus, there is a need for a lubrication arrangement that reduces stress levels experienced by bearing components.

SUMMARY OF THE INVENTION

An example bearing system includes an inner ring that surrounds an axis of rotation, an outer ring spaced radially outwards from the inner ring, and a cage that is positioned between the inner and outer rings to support a plurality of bearing elements. The inner ring includes an axial slot that extends in a direction along the axis of rotation. The inner ring also includes at least one radial side slot formed in at least one of a fore and aft end surface of the inner ring. The radial side slot directs lubricating fluid from the axial slot toward the cage to lubricate the plurality of bearing elements.

In one example, the radial side slot is formed in one of the fore and aft end surfaces of the inner ring and at least one fluid nozzle is positioned near the other of the fore and aft end surfaces. The radial side slot directs lubricating fluid toward one of fore and aft edges of the cage, and the fluid nozzle directs lubricating fluid toward the other of the fore and aft edges of the cage.

In one example, the bearing system is included in a turbine engine.

In one example, a method of delivering lubricating fluid to a bearing system is also provided. For example, the method includes dispensing lubricating fluid to bearing elements through a radial side slot formed within at least one of the fore and aft end surfaces of the inner ring.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 3:
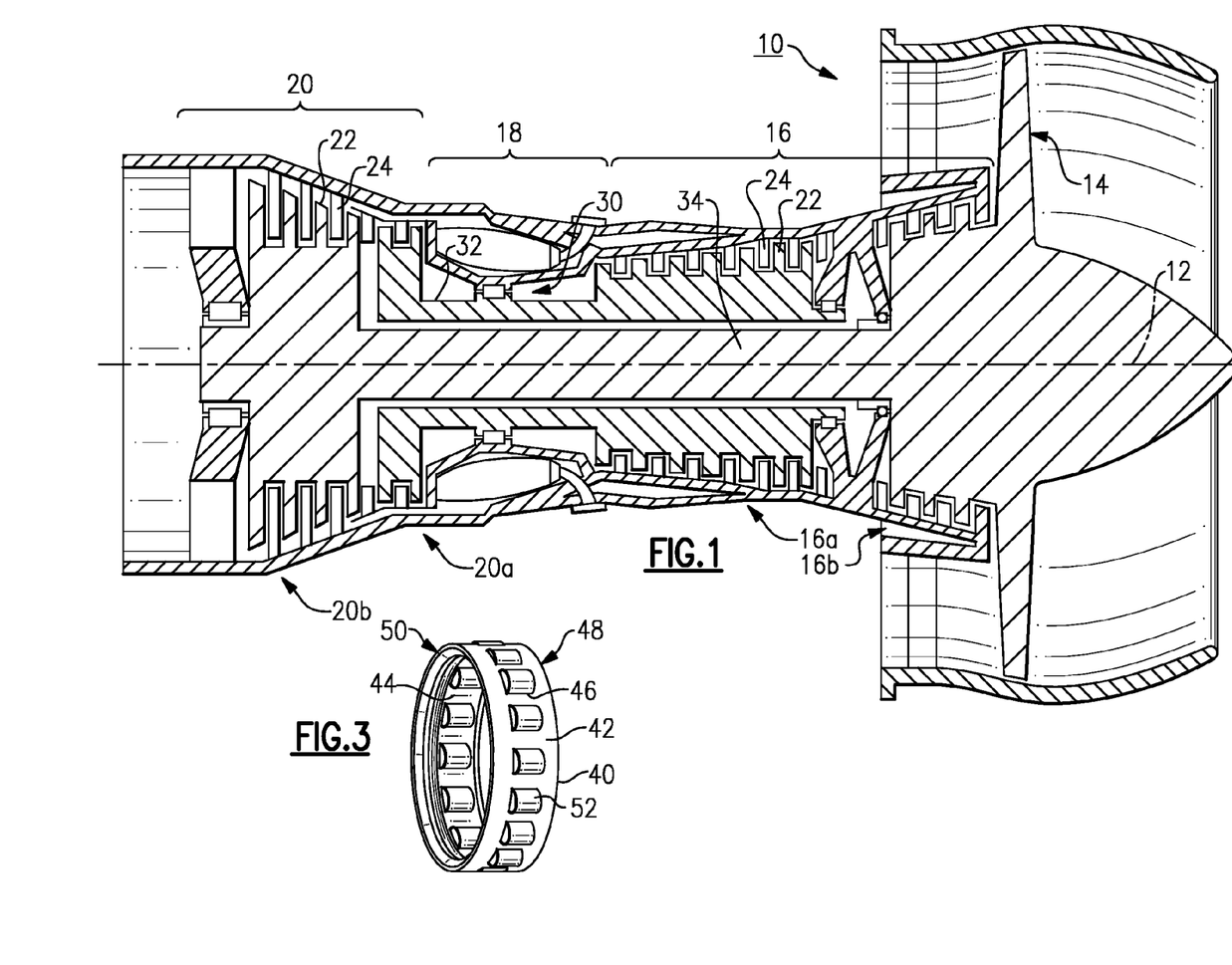
FIG. 1 illustrates an example gas turbine engine including a bearing system.
FIG. 3 illustrates an isolated view of one example of rolling elements and a cage assembly.
Figure 2:
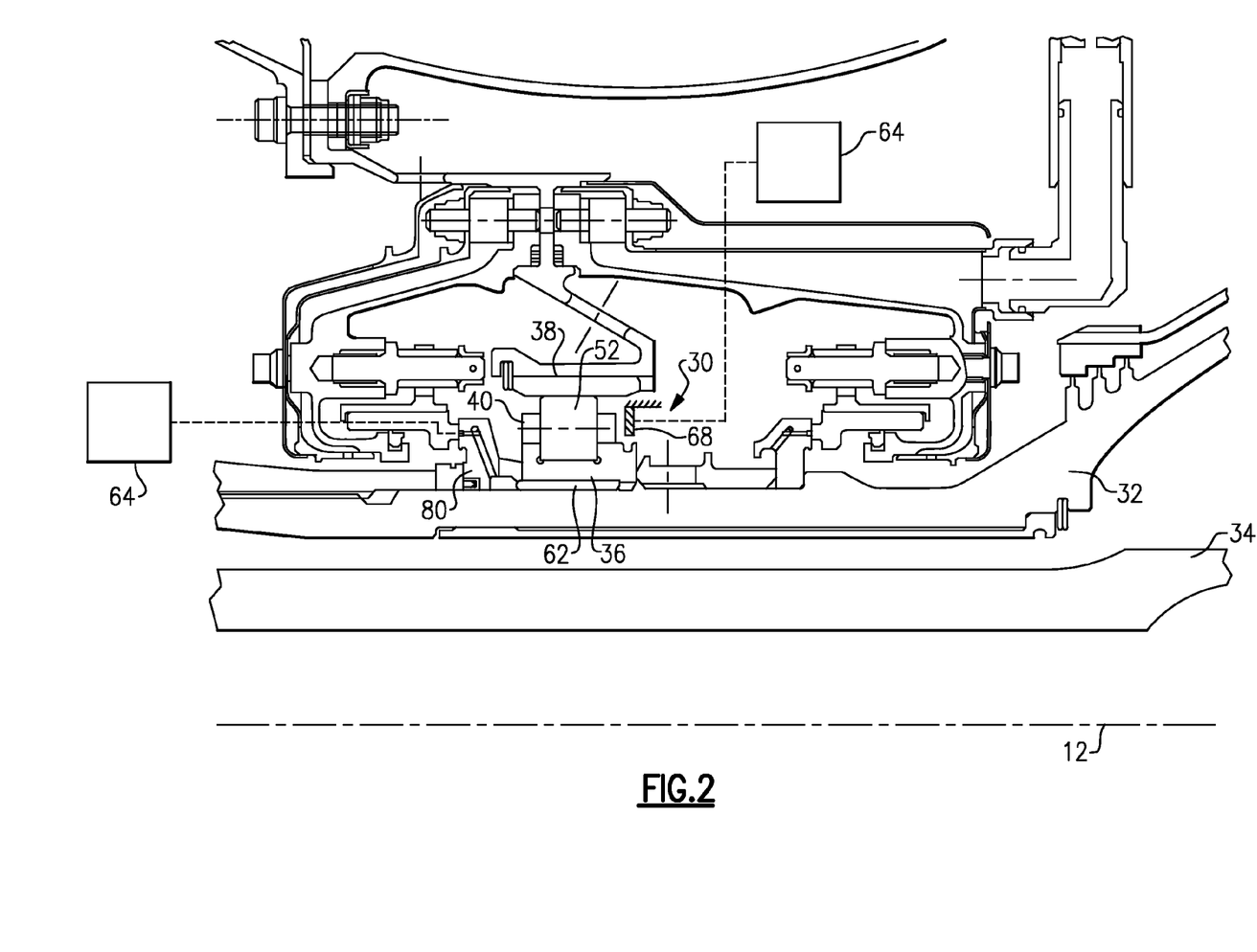
FIG. 2 illustrates a view of the bearing system of FIG. 1.

FIG. 1 illustrates selected portions of an example turbine engine 10, such as a gas turbine engine 10 used for propulsion. In this example, the gas turbine engine 10 is circumferentially disposed about an engine centerline 12. The gas turbine engine 10 includes a fan section 14, a compressor section 16, a combustion section 18, and a turbine section 20. The compressor section 16 and the turbine section 20 include corresponding blades 22 and vanes 24. The turbine section 20 includes a high pressure turbine (HPT) section 20a and a low pressure turbine (LPT) section 20b. Further, the compressor section 16 includes a high pressure compressor (HPC) section 16a and a low pressure compressor (LPC) section 16b. As is known, air compressed in the compressor section 16 is mixed with fuel and burned in the combustion section 18 to produce hot gasses that are expanded in the turbine section 20.

FIG. 1 is for illustrative purposes only and is not a limitation on the disclosed examples. Additionally, there are various other types of gas turbine engines, such as geared architecture engines, which could utilize the examples disclosed herein.

The gas turbine engine 10 includes a bearing system 30 associated with a shaft 32 that rotates about an axis of rotation defined by the engine centerline 12. The shaft 32 in this example rotates the HPT section 20a of the turbine section 20 and the HPC section 16a of the compressor section 16. However, it is to be understood that the bearing system 30 may also be applied to other portions of an engine, such as a low pressure shaft 34 for example, or to other types of machines.

Referring to FIGS. 2, 4A-4B, and 5A-5B, the bearing system 30 includes a first or inner ring 36 that surrounds the axis of rotation and is coupled in a known manner with the shaft 32, and a second or outer ring 38 that is spaced radially outwards from the inner ring 36 in a direction away from the axis of rotation. A bearing cage 40 is located between the inner ring 36 and the outer ring 38. As shown in FIG. 3, the bearing cage 40 includes a circumferential outer surface 42, a circumferential inner surface 44, and a plurality of circumferentially spaced retainer portions 46 that are located between an axially fore end 48 and an axially trailing or aft end 50. A plurality of bearing elements 52 are supported within the circumferentially spaced retainer portions 46 as known. The bearing elements 52 may be any of the various types of bearing elements known in the art, including cylindrical, ball, tapered, etc.

Figure 4A:
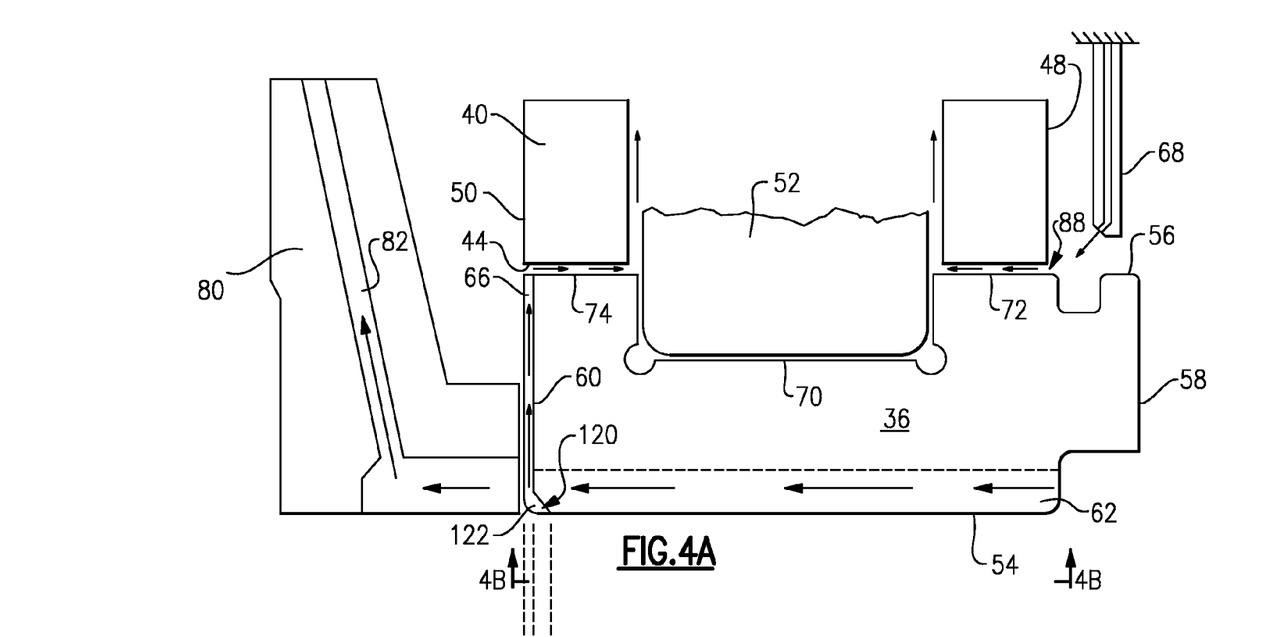
FIG. 4A illustrates one example of a roller bearing system.
Figure 4B:
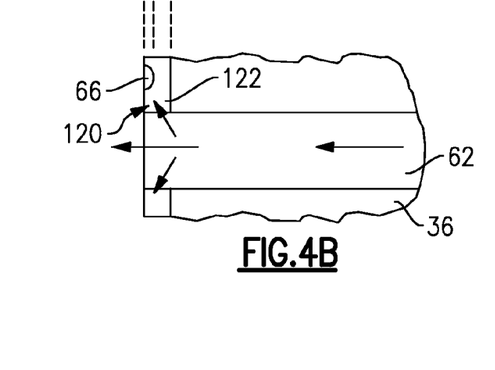
FIG. 4B is an inner circumferential view of a portion of the bearing system from FIG. 4A.
Figure 4C:
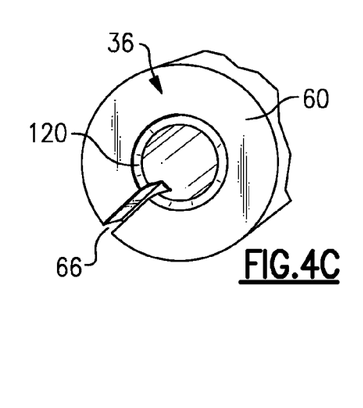
FIG. 4C is an isometric schematic view showing an end face of an inner ring from FIGS. 4A-4B.

As shown in FIG. 4A-4B, the inner ring 36 includes an inner circumferential surface 54 that surrounds the axis of rotation and an outer circumferential surface 56 that is spaced radially outwardly from the inner circumferential surface 54. A fore end surface 58 extends in a radial direction from the inner circumferential surface 54 to the outer circumferential surface 56. An aft end surface 60 is axially spaced from the fore end surface 58 and extends in a radial direction from the inner circumferential surface 54 to the outer circumferential surface 56. Thus the fore 58 and aft 60 end surfaces define opposing side edges of the inner ring 36.

As shown in FIG. 4A, the inner ring 36 includes a raceway 70 that is located between a forward or fore ring land 72 and a trailing or aft ring land 74 that generally protrude radially outwards from the raceway 70. The bearing elements 52 are located within the retainer portions 46 (FIG. 3) of the bearing cage 40 and are positioned in the raceway 70 axially between the fore 72 and aft 74 ring lands.

At least one fluid passage or axial slot 62 is formed in the inner ring 36. The axial slot 62 is formed within the inner circumferential surface 54 and extends in a direction along the axis of rotation. The axial slot 62 is in fluid communication with a lubrication system 64 (FIG. 2) of the gas turbine engine 10, which delivers lubricating fluid, such as oil for example, to the bearing elements 52.

At least one radial side slot 66 is formed in at least one of the fore 58 and aft 60 end surfaces of the inner ring 36. The radial side slot 66 extends in a radial direction that extends outwardly from the axis of rotation. In the example shown in FIGS. 4A-4B and 5A-5B, the radial side slot 66 is formed within the aft end surface 60. The radial side slot 66 provides a fluid passage such that lubricating fluid can be dispensed from the axial slot 62 toward the bearing cage 40.

As discussed above, the radial side slot 66 is formed in one of the fore 58 and aft 60 end surfaces of the inner ring 36. At least one fluid nozzle 68 is positioned near the other of the fore 58 and aft 60 end surfaces of the inner ring 36. In the example shown, the fluid nozzle 68 is axially spaced from the bearing cage 40 near the fore end surface 58 of the inner ring 36. The fluid nozzle 68 dispenses lubricating fluid to the bearing elements 52 by directing the fluid toward a gap 88 formed between the circumferential inner surface 44 of the bearing cage 40 and the outer circumferential surface 56 of the inner ring 36. The fluid nozzle 68 is also in fluid communication with the lubrication system 64 of the gas turbine engine 10. By supplying lubricating fluid through the fluid nozzle 68 and the radial side slot 66 the need for radial holes that extend radially from the axial slot 62 through the body of the inner ring is eliminated.

In operation, the lubrication system 64 delivers lubricating fluid to the fluid nozzle 68 and to the axial slot 62. For example, the lubrication system 64 is a known configuration and includes, for illustratively purposes only, a pump to move the lubricating fluid through the lubrication system 64. The lubricating fluid flows through the axial slot 62 along the inner circumferential surface 54 of the inner ring 36 and into the radial side slot 66 in the aft end surface 60 of the inner ring 36. The radial side slot 66 directs the lubricating fluid against the circumferential inner surface 44 of the bearing cage 40 near the aft end 50 of the bearing cage 40. The lubricating fluid is then directed along the circumferential inner surface 44 of the bearing cage 40 toward the bearing elements 52.

The lubrication system 64 may provide more lubricating fluid than required for the bearing system 30. In this regard, the bearing system 30 may also include a runner plate 80 adjacent the aft ring land 74 of the inner ring 36. The runner plate 80 may include at least one fluid passage 82 for receiving surplus lubricating fluid supplied by the axial slot 62 of the inner ring 36. The fluid passage 82 serves to collect the surplus fluid and circulates the surplus fluid back into the lubrication system 64.

Figures 5A, 5B, 6:
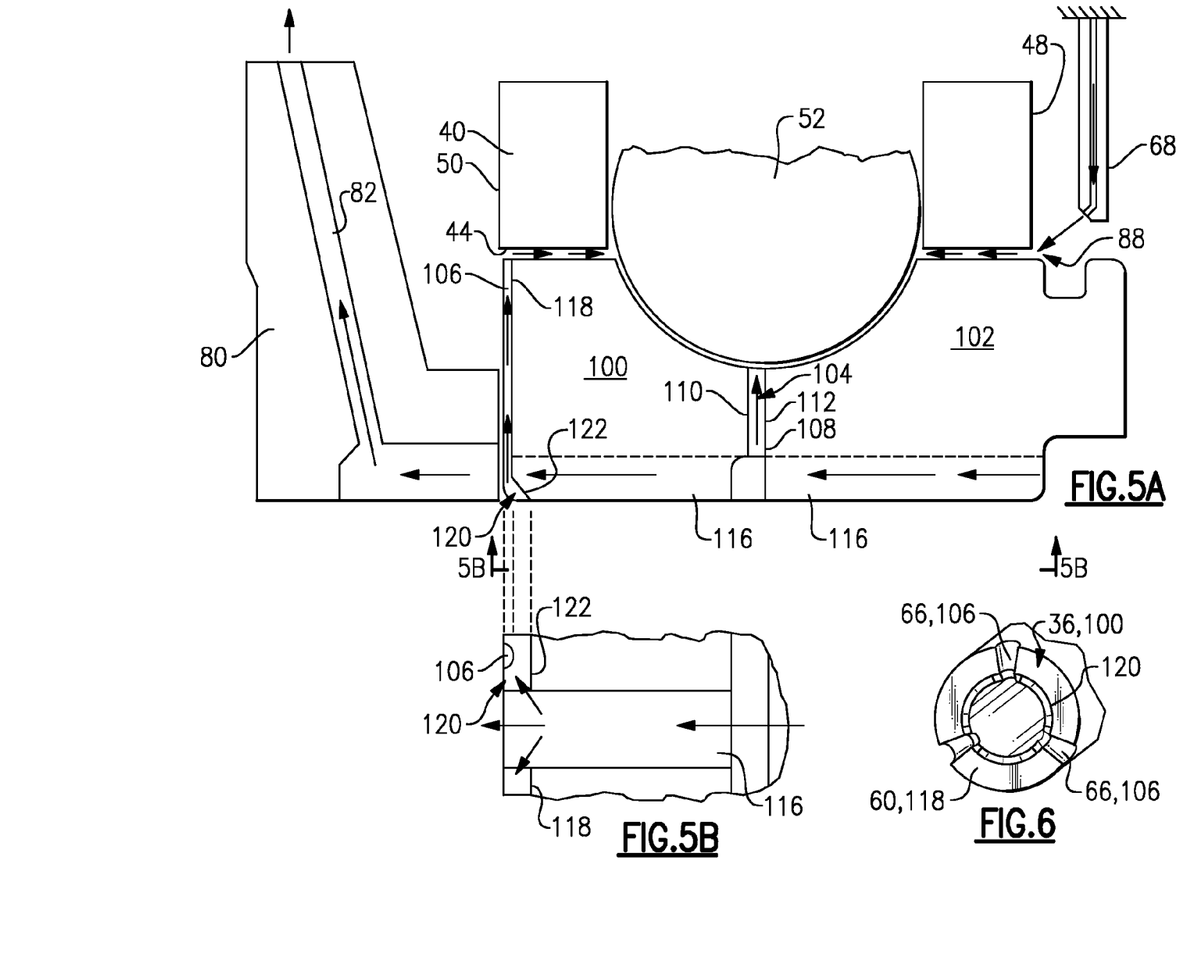
FIG. 5A illustrates another example of a ball bearing system.
FIG. 5B is an inner circumferential view of a portion of the bearing system from FIG. 5A.
FIG. 6 is a schematic isometric representation of an end face of an inner ring having a plurality of radial slots.

FIGS. 5A-5B show another example of a bearing system. This configuration is similar to that of FIGS. 4A-4B; however the inner ring 36 comprises a split ring. The split ring includes an aft ring piece 100 and a fore ring piece 102 that is axially spaced apart from the aft ring piece 100 by a gap 104. At least one radial side slot 106 is formed in an aft end surface 118 of the aft ring piece 100 similar to the radial side slot 66. Additionally, another radial side slot 108 is formed at the gap 104.

The aft ring piece 100 includes a fore face 110 that faces an aft face 112 of the fore ring piece 102. The fore 110 and aft 112 faces are separated by the gap 104. The radial side slot 108 is formed in one of the fore 110 and aft 112 faces. The radial side slots 106, 108 direct fluid from axial slots 116 formed within the aft 100 and fore 102 ring pieces toward the bearing cage 40 and bearing elements 52 in a manner similar to that described above with regard to FIGS. 4A-4B. The fluid nozzle 68 may also be used in a manner similar to that shown in FIGS. 4A-4B.

In each of the disclosed configurations an annulus 120 is included to facilitate distribution of the lubricating fluid. The annulus 120 is formed at a transition between the axial slot 62, 116 and the radial side slot 66, 106. The annulus 120 is defined by a tapered surface 122 that transitions from an inner circumferential surface of the inner ring to the aft end surface 60, 118 of the inner ring. The tapered surface 122 defines a plane that is obliquely oriented to the axis of rotation. Lubricating fluid is delivered to the annulus 120 via the axial slots 62, 116 where it is collected and then dispensed toward the bearing cage 40 via the radial side slots 66, 106 as described above.

The axial slots, radial side slots, and annulus cooperate to efficiently dispense lubricating fluid to the bearing elements. The disclosed bearing systems minimize inner ring stress by eliminating the need for radial holes extending through the inner ring and creating high stress concentrations where the hole and bore slot features intersect. The intersection of the side slot(s) with the annulus at the inner ring end face have significantly lower stress concentration levels.

It should be understood that each inner ring could include a plurality of axial slots and radial side slots. For example, FIG. 6 shows an example that includes a three slot configuration. In this example, the inner ring 36 or aft ring piece 100 includes three axial slots 62, 116 and three radial side slots 66, 108 that are formed within an aft end surface 60, 118 of the inner ring 36 or aft ring piece 100. The slots in this example are spaced approximate 120 degrees apart from each other; however other spacing configurations could also be used. Also, additional slots can be added or slots can be eliminated depending upon varying specifications.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A bearing system comprising:
an inner ring having an inner circumferential surface surrounding an axis of rotation, an outer circumferential surface spaced radially outwardly from said inner circumferential surface, a fore end surface extending from said inner circumferential surface to said outer circumferential surface, and an aft end surface axially spaced from said fore end surface and extending from said inner circumferential surface to said outer circumferential surface;
an outer ring spaced radially outwardly of said inner ring;
a plurality of bearing elements supported by a cage positioned between said inner ring and said outer ring;
wherein said inner ring includes at least one inner slot extending generally in an axial direction along said axis of rotation and wherein at least one of said aft end surface and said fore end surface includes at least one side slot extending from said at least one inner slot toward said cage such that lubricating fluid is directed to said plurality of bearing elements by said at least one inner slot and said at least one side slot; and
an annulus formed at an intersection between said at least one inner slot and said at least one side slot to collect and supply lubricating fluid for distribution to said at least one side slot, and wherein said annulus is defined by a tapered surface that transitions from said inner circumferential surface of said inner ring to one of said fore and said aft end surfaces.

2. The bearing system according to claim 1 wherein said cage defines an inner circumferential cage surface that surrounds said axis of rotation and wherein lubricating fluid is directed by said at least one side slot toward said inner circumferential cage surface.

3. The bearing system according to claim 1 wherein said at least one side slot is formed within one of said fore and said aft end surfaces and including at least one fluid nozzle to direct lubricating fluid toward a gap formed between a circumferential inner surface of said cage and said outer circumferential surface of said inner ring.

4. The bearing system according to claim 3 wherein said at least one fluid nozzle includes an outlet that faces said gap.

5. The bearing system according to claim 1 wherein said tapered surface defines a plane that is obliquely orientated relative to said axis of rotation.

6. The bearing system according to claim 1 wherein said at least one side slot is formed within said aft end surface to direct lubricating fluid toward an aft edge of said cage and including at least one fluid nozzle positioned at a gap formed between said outer circumferential surface of said inner ring and a circumferential inner surface of said cage at a fore end of said cage to direct lubricating fluid toward said fore end of said cage.

7. The bearing system according to claim 1 wherein said inner ring comprises a split ring with an aft ring piece surrounding said axis of rotation and a fore ring piece surrounding said axis of rotation, said fore ring piece and aft ring piece being axially separated from each other by a gap such that a fore face of said aft ring piece is spaced apart from and faces an aft face of said fore ring piece, and including at least one additional side slot formed within at least one of said fore and aft faces to direct lubricating fluid from said at least one inner slot toward said bearing elements.

8. The bearing system according to claim 1 wherein the at least one side slot comprises a slot that extends generally in a radial direction away from said axis of rotation.

9. A bearing system comprising:
an inner ring having an inner circumferential surface surrounding an axis of rotation, an outer circumferential surface spaced radially outwardly from said inner circumferential surface, a fore end surface extending from said inner circumferential surface to said outer circumferential surface, and an aft end surface axially spaced from said fore end surface and extending from said inner circumferential surface to said outer circumferential surface;
an outer ring spaced radially outwardly of said inner ring;
a plurality of bearing elements supported by a cage positioned between said inner ring and said outer ring;
wherein said inner ring includes at least one inner slot extending generally in an axial direction along said axis of rotation and wherein at least one of said aft end surface and said fore end surface includes at least one side slot extending from said at least one inner slot toward said cage such that lubricating fluid is directed to said plurality of bearing elements by said at least one inner slot and said at least one side slot and wherein said at least one side slot is formed within said aft end surface to direct lubricating fluid toward an aft edge of said cage;
at least one fluid nozzle positioned at a gap formed between said outer circumferential surface of said inner ring and a circumferential inner surface of said cage at a fore end of said cage to direct lubricating fluid toward said fore end of said cage;
an annulus formed at an intersection between said at least one inner slot and said at least one side slot to collect and supply lubricating fluid for distribution to said at least one side slot; and
a tapered surface that transitions from said inner circumferential surface of said inner ring to said aft end surface to form said annulus that collects and supplies lubricating fluid for distribution to said at least one side slot.

10. A turbine engine comprising:
a compressor section;
a combustion section downstream of said compressor section;
a turbine section downstream of said combustion section; wherein at least one of said compressor section, said compressor section, and said turbine section includes an engine shaft rotatable about an axis of rotation;
a bearing system including an inner bearing ring coupled with said engine shaft, an outer bearing ring spaced radially outwards from said inner bearing ring, and a bearing cage positioned between said inner bearing ring and said outer bearing ring to support a plurality of bearing elements, and wherein said inner bearing ring includes at least one inner slot extending in a generally axial direction along said axis of rotation and at least one side slot formed in at least one of a fore end surface and an aft end surface of said inner bearing ring to direct lubricating fluid from said at least one inner slot to said plurality of bearing elements; and
an annulus formed at an intersection between said at least one inner slot and said at least one side slot to collect and supply lubricating fluid for distribution to said at least one side slot, and
a tapered surface that transitions from an inner circumferential surface of said inner bearing ring to said at least one of said fore end surface and said aft end surface to form said annulus at said at least one of the fore end surface and the aft end surface.

11. The turbine engine according to claim 10 wherein said inner bearing ring has an inner circumferential surface surrounding said axis of rotation and an outer circumferential surface spaced radially outwardly from said inner circumferential surface, and wherein said fore end surface extends from said inner circumferential surface to said outer circumferential surface and said aft end surface is axially spaced from said fore end surface and extends from said inner circumferential surface to said outer circumferential surface, and wherein said at least one inner slot is formed within said inner circumferential surface.

12. The turbine engine according to claim 10 wherein said at least one side slot is formed within one of said fore end surface and said aft end surface and including at least one fluid nozzle positioned at the other of said fore and said aft end surfaces to direct lubricating fluid toward a gap formed between a circumferential inner surface of said cage and an outer circumferential surface of said inner ring.

13. The turbine engine according to claim 12 wherein said at least one fluid nozzle includes an outlet that faces said gap.

14. A method of providing a lubricating fluid to a bearing system that includes an inner bearing ring surrounding an axis of rotation, an outer bearing ring spaced radially outwards from the inner bearing ring, a bearing cage positioned between the inner bearing ring and the outer bearing ring, the bearing cage supporting a plurality of bearing elements, the method comprising:
    providing at least one inner slot in the inner bearing ring that extends generally in an axial direction along the axis of rotation;
    forming at least one side slot in one of a fore end surface and an aft end surface of the inner bearing ring;
    providing at least one fluid nozzle positioned adjacent the other of the fore and the aft end surfaces;
    dispensing the lubricating fluid from the at least one fluid nozzle in a direction toward a gap between the bearing cage and the inner bearing ring to lubricate the plurality of bearing elements;
    providing an annulus formed at an intersection between the at least one inner slot and the at least one side slot; and
    dispensing the lubricating fluid into the at least one inner slot, collecting the lubricating fluid from the at least one inner slot in the annulus, supplying the lubricating fluid in the annulus to the at least one side slot, and directing the lubricating fluid toward the cage via the at least one side slot.

15. The method according to claim 14 including positioning an outlet of the at least one fluid nozzle to face the gap.

16. A method of providing a lubricating fluid to a bearing system that includes an inner bearing ring surrounding an axis of rotation, an outer bearing ring spaced radially outwards from the inner bearing ring, a bearing cage positioned between the inner bearing ring and the outer bearing ring, the bearing cage supporting a plurality of bearing elements, the method comprising:
    providing at least one inner slot in the inner bearing ring that extends generally in an axial direction along the axis of rotation;
    providing at least one side slot formed in at least one of a fore end surface and an aft end surface of the inner bearing ring;
    providing an annulus formed at an intersection between the at least one inner slot and the at least one side slot;
    forming a tapered surface that transitions from an inner circumferential surface of the inner bearing ring to the at least one of the fore end surface and the aft end surface to form the annulus at the at least one of the fore end surface and the aft end surface; and
    dispensing the lubricating fluid into the at least one inner slot, collecting the lubricating fluid from the at least one inner slot in the annulus, supplying the lubricating fluid in the annulus to the at least one side slot, and directing the lubricating fluid toward the cage via the at least one side slot.

* * * * *

UNITED STATES PATENT AND TRADEMARK OFFICE
CERTIFICATE OF CORRECTION

PATENT NO. : 9,121,303 B2  
APPLICATION NO. : 12/136300  
DATED : September 1, 2015  
INVENTOR(S) : Louis J. Dobek Page 1 of 1

It is certified that error appears in the above-identified patent and that said Letters Patent is hereby corrected as shown below:

IN THE CLAIMS:

In claim 10, column 6, line 42; delete "compressor" and replace with --combustion--

In claim 10, column 6, line 55; delete "and"

Signed and Sealed this
Twenty-ninth Day of March, 2016

Michelle K. Lee
*Director of the United States Patent and Trademark Office*